United States Patent [19]
Turner et al.

[11] 3,938,770
[45] Feb. 17, 1976

[54] METHOD AND APPARATUS FOR HYDRAULICALLY SUSPENDING A VEHICLE SEAT

[75] Inventors: Leland D. Turner, East Peoria; Donald L. Smith, Peoria, both of Ill.

[73] Assignee: Caterpillar Tractor Co., Peoria, Ill.

[22] Filed: Oct. 7, 1974

[21] Appl. No.: 512,195

[52] U.S. Cl. .................. 248/400; 60/407; 91/390; 297/330
[51] Int. Cl.². ... F15B 1/02; F16M 13/00; F15C 4/00
[58] Field of Search ..... 248/400; 297/330; 267/120, 267/153; 91/390, 469; 60/407

[56] References Cited
UNITED STATES PATENTS

| | | | |
|---|---|---|---|
| 3,150,855 | 9/1964 | Carter et al. | 248/400 |
| 3,300,203 | 1/1967 | Carter et al. | 248/400 UX |
| 3,430,444 | 3/1969 | Kamp | 60/407 |
| 3,470,692 | 10/1969 | Kamp | 60/407 |
| 3,474,623 | 10/1969 | Barrett et al. | 297/330 X |
| 3,668,870 | 6/1972 | Hall | 267/120 |

*Primary Examiner*—J. Franklin Foss
*Attorney, Agent, or Firm*—Phillips, Moore, Weissenberger Lempio & Strabala

[57] ABSTRACT

The present invention provides a simple and effective method and apparatus for hydraulically suspending a vehicle seat while regulating movement of the seat in response to vertical travel of the vehicle, a reciprocable power piston within a cylinder comprising a flexible coupling between the seat and a suitable support structure, a control valve selectively communicating a source of fluid with the cylinder in response to pressure variations developed by movement of the power piston within its cylinder. The invention also preferably includes load compensating means for limiting the control function in response to relatively minor movement of the piston as well as a damped leveling unit partially formed by the power piston for providing hydraulic response to limited movement of the piston.

16 Claims, 3 Drawing Figures

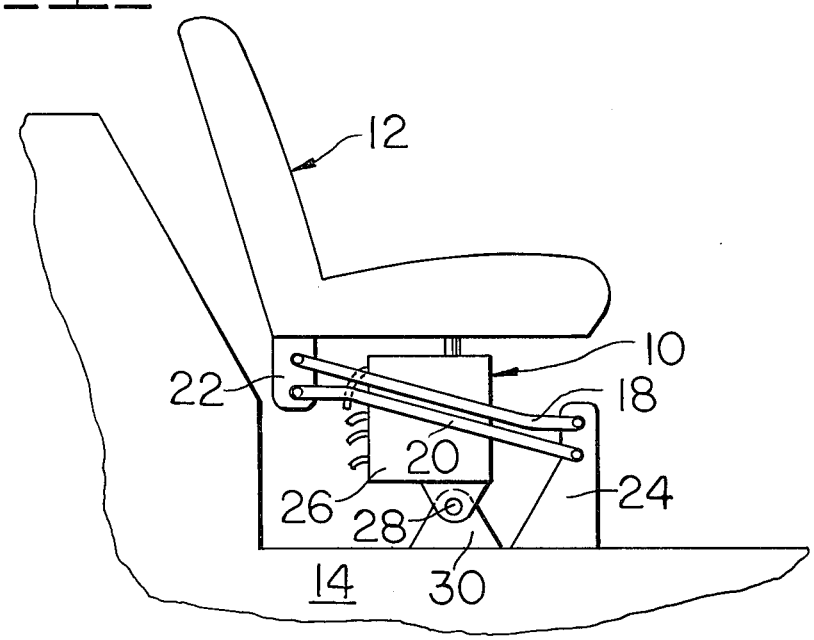
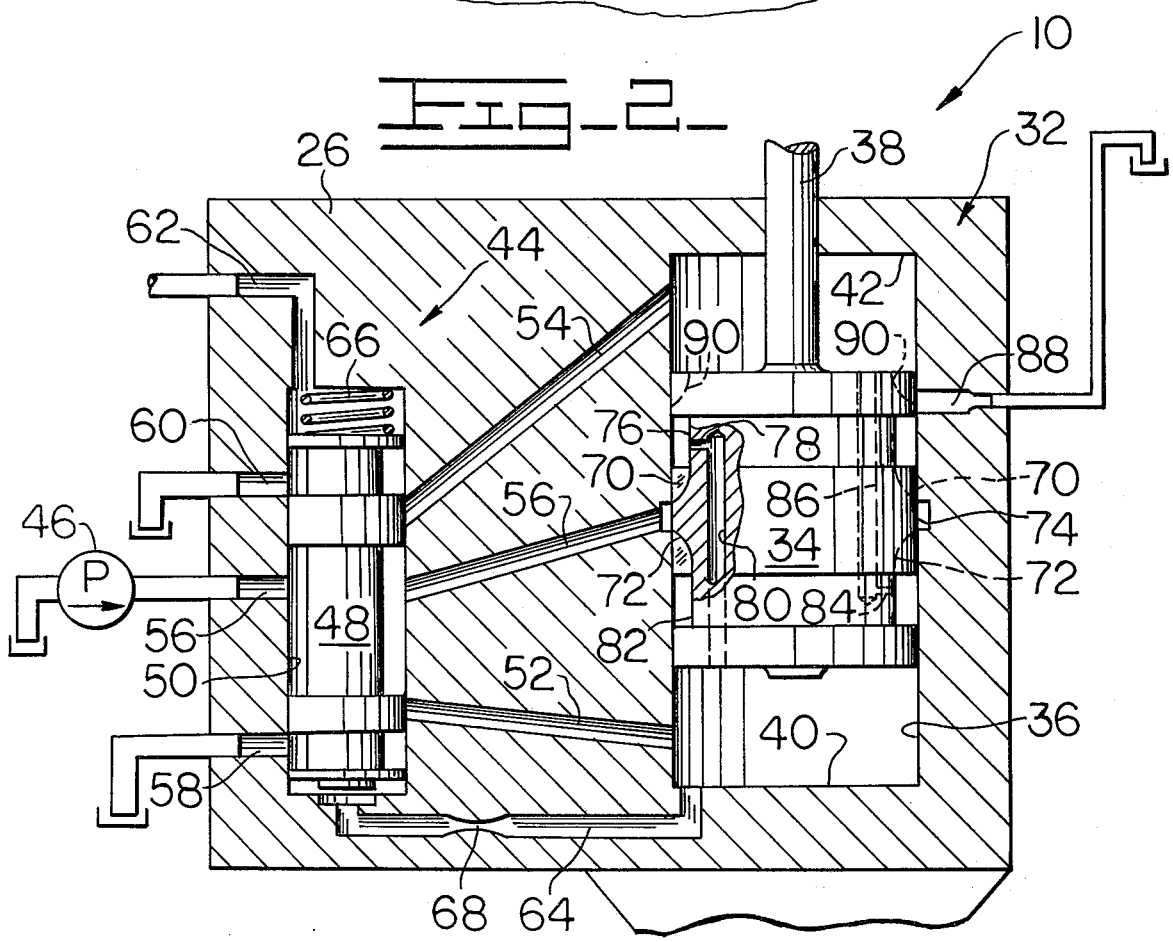

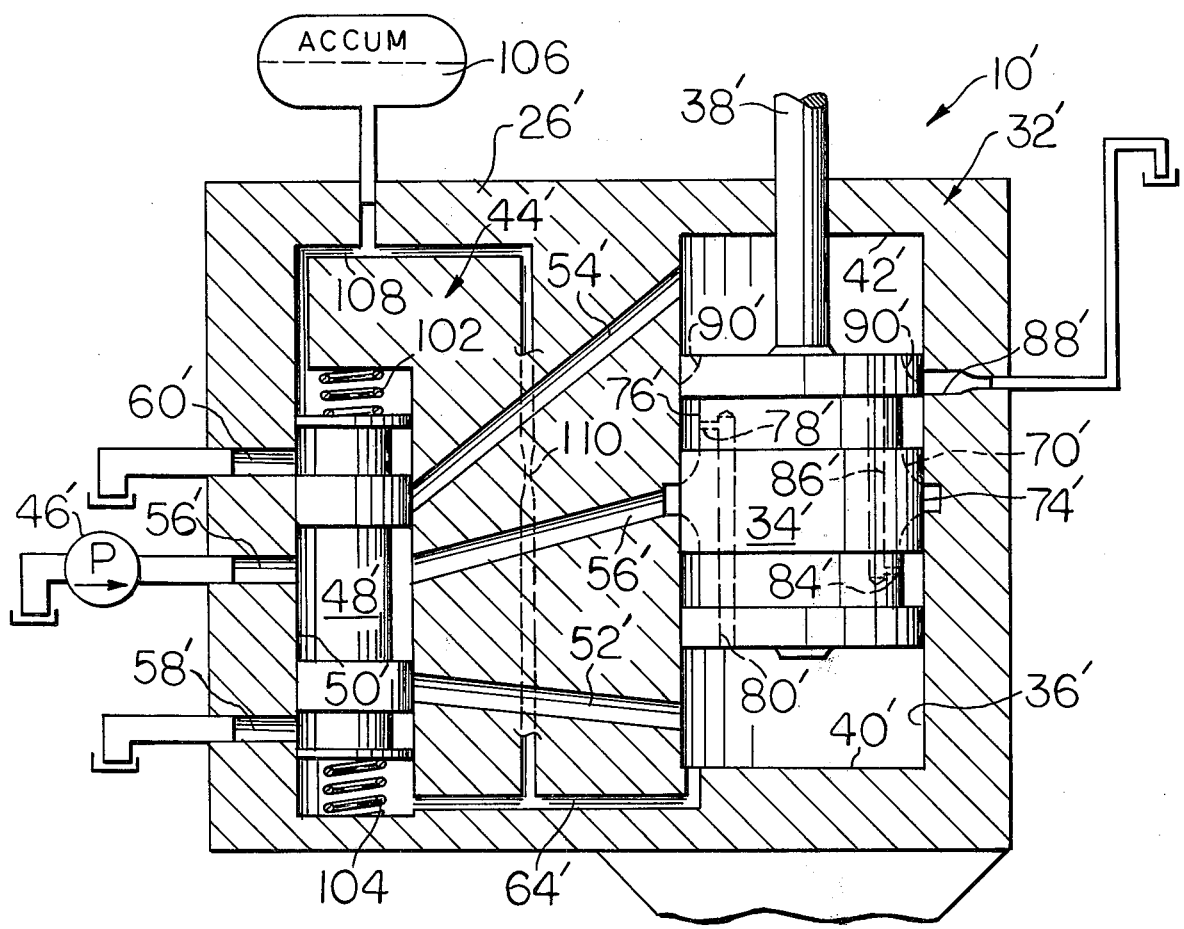

METHOD AND APPARATUS FOR HYDRAULICALLY SUSPENDING A VEHICLE SEAT

BACKGROUND OF THE INVENTION

The present invention relates to a method and apparatus for providing a hydraulic suspension assembly. The hydraulic suspension assembly is particularly contemplated for regulating movement of a vehicle seat in response to vertical travel of the vehicle occurring, for example, when the vehicle is operating over uneven terrain.

The method and apparatus of the present invention more broadly provide hydraulic stabilization in a suspension assembly for supporting a spring mass relative to an unsprung mass.

Many existing suspension systems provide a nearly constant spring rate by means of either a mechanical or fluid suspension linkage. Suspension systems of this type may be undesirable in certain applications such as on earthmoving machines, for example, where the vehicle may operate over very different types of terrain, including both very rough off-highway travel and relatively smooth on-highway operation. One disadvantage for such systems is that the stabilizing force imposed upon a suspended or spring element such as an operator seat is much greater when the vehicle is traveling over rough terrain as compared to situations where the vehicle is traveling over relatively smooth terrain. This comparison exists because the response of the suspension system is generally proportional to the amount of vertical travel encountered or experienced by the vehicle or unsprung mass.

Hydraulic suspension assemblies are also known in the prior art which respond to acceleration forces developed during vertical travel of the vehicle. Such systems may provide a variable spring rate or response for overcoming problems such as those noted above. Hydraulic suspension units of this type are described for example, in U.S. Pat. Nos. 3,492,013; 3,095,214; and 3,300,203; the last noted patent being assigned to the assignee of the present invention.

SUMMARY OF THE INVENTION

It is accordingly an object of the invention to provide a hydraulic suspension assembly for a vehicle seat.

It is also an object of the invention to provide a method and apparatus for hydraulically stabilizing a spring mass supported relative to an unsprung mass by means of a power piston reciprocably arranged within a power cylinder.

It is another object of the invention to provide control means for adjusting the position of the power piston within the power cylinder relative to pressure variations developed within the power cylinder by the piston.

It is a further object of the invention to provide such a method and apparatus wherein response of the power piston is limited by a load compensating means.

It is yet another object of the invention to provide such a method and apparatus of hydraulically stabilized suspension wherein a damped levelling system is partially formed by the load piston itself for regulating its response to relatively limited external forces.

Additonal objects and advantages of the invention are made apparent in the following description having reference to the accompanying drawings.

DESCRIPTION OF THE DRAWINGS

FIG. 1 illustrates the hydraulic suspension of the present invention in connection with a vehicular seat mounted upon a suitable support structure.

FIG. 2 is a fragmentary view, with parts in section, of a power cylinder and control valve for the present hydraulic suspension assembly arranged within a common housing.

FIG. 3 is a view similar to FIG. 2 while illustrating another embodiment of the present hydraulic suspension assembly.

DESCRIPTION OF THE PREFERRED EMBODIMENT

Referring now to FIG. 1, a hydraulic suspension assembly of the type contemplated by the present invention is indicated at 10 for regulating relative movement between a vehicular seat assembly 12 and a suitable support structure 14. It is not believed necessary to illustrate any other portions of the vehicle except to note that a vehicle employing the arrangement of FIG. 1 may preferably be an earthmoving vehicle or other type of material handling machine adapted for operation in off-highway as well as on-highway applications.

The seat assembly 12 is movably secured to the support structure 14 by means of a quadrilateral support linkage indicated at 16. The linkage 16 includes a similar combination of elements one each side of the seat assembly, elements on only one side of the seat assembly being illustrated in FIG. 1. Upper and lower links 18 and 20 are pivotably interconnected between a first bracket 22 secured to the seat assembly 12 and a second bracket 24 secured to the support structure 14.

The hydraulic suspension assembly 10 preferably includes a single housing indicated at 26 which is pivotably fixed at 28 to another bracket 30 which is also secured to the support structure 14.

A hydraulic power unit which is included within the suspension assembly 10 to provide a coupling with the seat assembly 12 is best illustrated at 32 in FIG. 2. The power unit 32 is arranged within the common housing 26 and includes a power piston 34 reciprocably arranged within a cylinder or bore 36 formed by the housing 26. An elongated rod 38 is integrally secured to the piston 34 and penetrates the housing 26 at one end of the bore 36 to be coupled with the seat assembly 12 as may be best seen in FIG. 1.

Through the above arrangement, it may be seen that the piston 34 tends to be positioned in the cylinder 36 in response to relative movement between the seat assembly 12 and the support structure 14. Relative downward movement of the seat assembly 12 tends to urge the piston 34 toward a first or lower end 40 of the cylinder 36, such relative movement tending to occur for example when a vehicle bounces upwardly. Corresponding upward movement of the seat assembly 12 is resisted by the weight of an operator (not shown). Subsequent downward travel of the vehicle, or course, tends to cause the piston 34 to move upwardly toward a second or upper end 42 of the cylinder 36.

The hydraulic suspension assembly 10 also includes a control valve 44, of particularly simple construction, in combination with the power unit 32 for regulating relative movement between the seat assembly 12 and the support structure 14. The structural simplicity within the suspended assembly 10 according to the present invention is accomplished by employing pressure variations developed within the power unit 32 in response to relative movement between the seat assembly 12 and support structure 14 for regulating operation of the control valve 44. The control valve 44 in turn serves to selectively communicate a source of fluid under pressure, generally indicated at 46, and a fluid drain means described below with the rod and head ends 42 and 40 of the power unit 32.

The control valve 44 comprises a spool 48 reciprocably arranged within a bore 50 which is also formed by the housing 26. The bore 50 is in respective communication with the head and rod ends of the power cylinder 36 by means of respective passages 52 and 54. Both the control valve bore 50 and the power cylinder 36 are in communication with the source or pump 36 by means of a supply passage 56. The control valve bore 50 is also in communication with drain passages 58 and 60 which are generally arranged in opposing relation to the passages 52 and 54. An additional passage 62 merely serves to permit fluid evacuation from the bore 50 above the spool 48.

The control valve spool 48 is responsive to pressure vatiations within the power cyclinder 36 through an interconnecting signal passage indicated at 64. The signal passage 64 communicates the lower or head end 40 of the power cylinder 36 with the lower end of the control valve bore 50. Accordingly, increasing pressure within the head end 40 of the power cylinder tends to urge the control valve spool 48 upwardly against a spring 66. As noted above, such a situation may exist, for example, when the vehicle moves upwardly while traveling over rough terrain with corresponding movement of the seat assembly 12 being resisted by the weight of an operator. Conversely, when a pressure decrease develops within the head end 40 of the cylinder 36, the control valve 48 tends to be moved downwardly under the influence of the spring 66.

Under static conditions, the power piston 34 tends to be in a position as illustrated in FIG. 2 where it blocks the supply passage 56. Similarly, under static conditions, the control valve spool 48 tends to be centered in a position where it blocks each of the passages 52 and 54 from communication with the supply passage 56. Accordingly, the power piston 34 tends to remain in its illustrated position within the cylinder 36 until some relative movement occurs between the seat assembly 12 and support structure 14. Operation of the power piston in response to such relative movement is described below.

Before describing the manner of operation for the hydraulic suspension assembly, it is desirable to first set forth two additional features of the invention. The first such feature is a load compensating orifice 68 arranged along the signal passage 64 for limiting fluid flow between the head end 40 of the power cylinder 36 and the lower end of the control valve bore 50. Accordingly, the orifice 68 functions either alone or in combination with the spring 66 to limit response of the control valve spool 48 to pressure variations within the cylinder 36.

Additionally, the power piston 34 forms a damped levelling system for regulating its own response to relatively minor external forces tending to cause its movement within the cylinder 36. Such minor forces may develop, for example, when the operator shifts about upon the seat 12 or minor movement is caused between the seat assembly 12 and support structure 14 which does not require adjustment through the suspension assembly 10. Within the preferred embodiment, the damped levelling system formed integrally within the power piston 34 in order to simplify construction of the common housing 26. The piston 34 forms separate sets of metering slots 70 and 72 which are spaced apart by an intermediate land 74 which blocks the supply passage 56 under static conditions as noted above. The metering slots 70 are in communication with an annular groove indicated at 76. The annular groove 76 is also in communication with the head end 40 of the cylinder 36 by means of a restrictive orifice 78 and an elongated passage 80.

The metering slots 72 similarly open into communication with an annular groove 82 which is in communication with the rod end 42 of the cylinder 36 through a restrictive orifice 84 and an elongated passage 86.

The load levelling elements described above cooperate to maintain the power piston in its centered position while under the influence of minor external forces. For example, minor forces tending to urge the power piston 34 upwardly cause the supply passage 56 to be in communication through the metering slot 72 and the annular groove 82 with the restrictive orifice 84 and also by the metering slots 72. Increased pressurization which results in the rod end of the cylinder tends to urge the power piston downwardly toward its centered position whereupon communication between the supply passage 56 and the metering slots 72 is terminated.

On the other hand, movement of the power piston downwardly, for example, in response to movement of an operator upon the seat assembly 12 (see FIG. 1), places the supply passage 56 in communication through the metering slots 70 and annular groove 76 with the restrictive orifice 78 and the passage 80. Accordingly, fluid under pressure enters the head end 40 of the cylinder as primarily regulated by the restrictive orifice 78 and also by the metering slots 70. Upward movement of the power piston 34 results until it is again returned to its center position blocking the supply passage 56.

When the power piston 34 moves downwardly so that the supply passage 56 is communicated with the head end 40, the rod end 42 of the cylinder 36 is in communication with a drain passage 88 across metering slots indicated at 90. Fluid flow from the supply passage 56 into the head end 40 of the cylinder 36 is balanced by fluid flow to drain from the rod end 42. Similarly, when the power piston 34 moves upwardly resulting in communication of the supply passage 56 with the rod end 42 of the cylinder, the head end 40 of the power cylinder is placed in communication with the drain passage 88 by means of the elongated passage 80, the restrictive orifice 78 and the annular groove 76. The restrictive orifice 78 thus serves to meter fluid flow to drain from the head end 40 of the power cylinder. A portion of the drain passage 88 is preferably elevated relative to the rod end 42 of the power cylinder 36 in order to prevent undesirable fluid evacuation from the power cylinder.

In operation of the embodiment illustrated at FIG. 2, the power piston 34 and the control valve spool 48 tend to assume their illustrated positions under static conditions with an operators weight being carried by the seat assembly 12. The control valve 44 may, of course, be adjusted by conventional means (not shown) in order to adapt operation of the hydraulic suspension assembly to a given operator's weight.

As was noted above, relatively limited movement between the seat assembly 12 and the support structure 14 is accommodated by the levelling system formed within the power piston 34. The elements of the leveling system function as described immediately above to maintain the power piston 34 in its centered position as illustrated in FIG. 2.

When larger external forces tend to cause relatively increased movement between the seat assembly 12 and support structure 14, the control valve 44 is actuated by pressure variations within the head end 40 of the power cylinder 36 in order to return the power piston 34 to its centered position. For example, when the seat 12 moves downwardly, the power piston 34 is urged downwardly and causes increased pressure within the head end of the cylinder 36. That increased pressure is communicated across the restrictive orifice 68 and urges the control valve spool 48 upwardly against its spring 66 to communicate the supply passage 56 with the rod end 42 of the cylinder through the passage 54. At the same time, the head end 40 is placed in restricted communication with the drain passage 88 across the orifice 78. The power piston 34 is thereby moved downwardly toward or into the head end of the cylinder to accommodate relative downward movement of the seat assembly (see FIG. 1).

Relative movement of the seat assembly, as described above, may be caused for example, when a vehicle hits a bump or other obstruction in its path tending to cause the vehicle and support structure 14 to move upwardly. After the vehicle passes the bump or obstruction and the support structure 14 again moves downwardly, the power piston 34 will, of course, tend to move upwardly in the cylinder 36, reducing pressure within the head end 40. Under these conditions, the spring 66 urges the spool 48 downwardly so that the supply passage 56 is placed in communication with the head end 40 of the cylinder 36 through the passage 52. At the same time, the rod end 42 of the cylinder is placed in communication with the drain passage 88 across the metering slots 90. Accordingly, the power piston 34 is again shifted upwardly toward its centered position at a controlled rate.

The sequence described above applies to typical situations where a vehicle encounters an obstruction, the seat 12 and support structure first tending to move toward each other and then moving apart into their normal relative positions. Of course, if the vehicle were to encounter a depression in its path, the seat assembly 12 and support structure 14 might tend to first move relatively apart from each other and then toward each other to assume their normal relative positions. In that event, the control valve 44 would first function in response to reduced pressure within the head end 40 of the cylinder 36 to supply fluid under pressure through the passage 52. Subsequently, the control valve 44 would function in response to increased pressure within the head end 40 of the cylinder in order to supply fluid under pressure through the passage 54 into the rod end 42 of the power cylinder.

At the same time when the control valve 44 is functioning in response to pressure variations within the head end 40 of the cylinder 36, its initial rate of response is determined by the restrictive orifice 68. The rate of response for the control valve spool 48 is further affected by the spring 66 which may thus be seen as acting in combination with the restrictive orifice 68.

Another embodiment 10' of the hydraulic suspension assembly is illustrated in FIG. 3. The hydraulic suspension assembly 10' of FIG. 3 corresponds closely to that described above for FIG. 2. Accordingly, similar elements are indicated by similar primed numerals.

The embodiment of FIG. 3 differs from that of FIG. 2 primarily in the manner in which load compensation is provided for the control valve 44'. Note that whereas the control valve spool 48 of FIG. 2 has a single centering spring 66, the control valve spool 48' of FIG. 3 has centering springs 102 and 104 arranged in opposite ends of its bore 50'. In addition, the embodiment of FIG. 2 includes the restrictive orifice 68 arranged along the passage 64 in communication between the head end of the power cylinder 36 and the bottom of the control valve spool 50. In FIG. 3, a similar passage 64' provides free communication between the head end 40' of the cylinder 36' and the bottom of the control valve bore 50'. However, a load compensating accumulator 106 of a hydropneumatic type containing air or nitrogen over hydraulic fluid is arranged in communication with the upper end of the bore 50' by means of a branched passage 108. The branched passage 108 also forms a restrictive orifice 110 limiting fluid flow between opposite ends of the control valve bore 50' through the passages 64' and 108.

The combination of the orifice 110 and the accumulator 106 tend to reduce the effect of dynamic fluid pressure from the head end 40' of the power cylinder 36' in acting on the control valve spool 48' in conjunction with the upper spring 102. Accordingly, the control valve spool 48' tends to move upwardly in response to increased pressure within the head end 40' of the power cylinder 36'. On the other hand, decreasing pressure within the head end 40' of the power cylinder 36 is immediately sensed within the lower end of the control valve bore 50'. A corresponding pressure reduction at the upper end of the control valve bore 50' is delayed because of the combined effect of the orifice 110 and the available supply of fluid under pressure from the accumulator 106. Thus, the control valve spool 48' functions in substantially the same manner described above with relation to the embodiment of FIG. 2 in response to pressure increases and pressure decreases within the head end 40' of the power cylinder 36. However, actuation of the control valve spool 48' is delayed or limited by the load compensating combination of both the accumulator 106 and restrictive orifice 110 acting together with the springs 102 and 104.

It will be obvious in either the embodiment of FIG. 2 or the embodiment of FIG. 3 that numerous modifications may be made within the scope of the present invention. In particular, it is noted that the restrictive orifices 78 and 84 together with the elongated passages 80 and 86 within the power piston 34 could also be formed by the housing 26. However, as was noted above, those components are preferably formed by the power piston 34 in order to simplify construction of the housing 26. Still further, it would also be possible to form the restrictive orifice 68 internally within the control valve spool 48, for example, to regulate fluid communication from the passage 52 into the lower end of the control valve bore 50. Such a modification would still further simplify construction of the housing 26.

We claim:

1. A hydraulic suspension assembly for regulating movement of a vehicular seat in response to vertical travel of the vehicle, comprising
    a power piston reciprocably arranged within a power cylinder, the piston and cylinder comprising a flexible coupling between the vehicular seat and a suitable support structure, the power piston tending to be movable within the power cylinder and to develop pressure variations within the power cylinder in response to relative movement between the vehicular seat and the support structure, a source of fluid under pressure, a control valve for selectively communicating the source and a fluid drain with the power cylinder on opposite sides of the power piston, means for operating the control valve in response to the pressure variations developed within the power cylinder by the power piston in order to establish said selected communication for the source and fluid drain with the power cylinder, and load compensating means for limiting response of the control valve to the operating means in response to relatively minor pressure variations developed within the power cylinder, the load compensating means comprising a restrictive orifice for communicating one end of the control valve spool with an end of the power cylinder subject to increased pressurization in response to downward movement of the vehicular seat relative to the vehicle.

2. A hydraulic suspension assembly for regulating movement of a vehicular seat in response to vertical travel of the vehicle, comprising a power piston reciprocably arranged within a power cylinder, the piston and cylinder comprising a flexible coupling between the vehicular seat and a suitable support structure, the power piston tending to be movable within the power cylinder and to develop pressure variations within the power cylinder in response to relative movement between the vehicular seat and the support structure, a source of fluid under pressure, a control valve for selectively communicating the source and a fluid drain with the power cylinder on opposite sides of the power piston, the control valve comprising a spring-centered control valve spool reciprocably arranged within a control valve bore, means for operating the control valve in response to the pressure variations developed within the power cylinder by the power piston in order to establish said selected communication for the source and fluid drain with the power cylinder, and load compensating means for limiting response of the control valve to the operating means in response to relatively minor pressure variations developed within the power cylinder, the load compensating means comprising a signal passage communicating a portion of the power cylinder with one end of the control valve spool, the other end of the control valve spool being in communication with a fluid accumulator, the one end of the control valve spool being in communication both with the other end of the control valve spool and the accumulator by means of a restrictive orifice.

3. A hydraulic suspension assembly for regulating movement of a vehicular seat in response to vertical travel of the vehicle, comprising a power piston reciprocably arranged within a power cylinder, the piston and cylinder comprising a flexible coupling between the vehicular seat and a suitable support structure, the power piston tending to be movable within the power cylinder and to develop pressure variations within the power cylinder in response to relative movement between the vehicular seat and the support structure, a source of fluid under pressure, a control valve for selectively communicating the source and a fluid drain with the power cylinder on opposite sides of the power piston, means for operating the control valve in response to the pressure variations developed within the power cylinder by the power piston in order to establish said selected communication for the source and fluid drain with the power cylinder, load compensating means for limiting response of the control valve to the operating means in response to relatively minor pressure variations developed within the power cylinder, and a damped levelling system for separately regulating selective communication of the source with the power cylinder in response to relatively small external forces tending to shift the power piston within the power cylinder.

4. The hydraulic suspension assembly of claim 3 wherein the damped levelling system is integrally formed by the power piston.

5. The hydraulic suspension assembly of claim 4 wherein the power piston comprises first and second restrictive orifices selectively communicating the source with opposite ends of the power cylinder.

6. A hydraulic suspension assembly for regulating movement of a vehicular seat in response to vertical travel of the vehicle, comprising a power piston reciprocably arranged within a power cylinder, the piston and cylinder comprising a flexible coupling between the vehicular seat and a suitable support structure, the power piston tending to be movable within the power cylinder and to develop pressure variations within the power cylinder in response to relative movement between the vehicular seat and the support structure, a source of fluid under pressure, a control valve for selectively communicating the source and a fluid drain with the power cylinder on opposite sides of the power piston, means for operating the control valve in response to the pressure variations developed within the power cylinder by the power piston in order to establish said selected communication for the source and fluid drain with the power cylinder, and a damped levelling system for separately regulating selective communication of the source with the power cylinder in response to relatively small external forces tending to shift the power piston within the power cylinder.

7. The hydraulic suspension assembly of claim 6 wherein the damped levelling system is integrally formed by the power piston.

8. The hydraulic suspension assembly of claim 7 wherein the power piston comprises first and second restrictive orifices selectively communicating the source with opposite ends of the power cylinder.

9. In a hydraulic stabilizer assembly for supporting a sprung mass relative to an unsprung mass by means of a power piston reciprocably arranged within a power cylinder, the stabilizer assembly including a source of fluid under pressure, a fluid drain means and a control means for selectively communicating the source and drain means with the power cylinder, the control means comprising
- a control valve for selectively communicating both the source drain means with opposite sides of the power piston within the power cylinder, the control valve comprising a spring-centered control valve spool reciprocably arranged within a control valve bore,
- regulator means for operating the control valve in response to pressure variations developed by movement of the power piston within the power cylinder in response to relative vertical movement between the sprung and unsprung masses, and
- load compensating means for limiting response of the control valve to relatively minor pressure variations developed within the power cylinder, the load compensating means comprising a restrictive orifice for communicating one end of the control valve spool with a portion of the power cylinder subject to increased pressurization upon relative movement of the sprung mass and unsprung mass toward each other.

10. The hydraulic stabilizer assembly of claim 9 further comprising a damped levelling system separately providing selective communication of the source and drain means with opposite sides of the power piston in response to relatively minor external forces tending to shift the power piston within the power cylinder.

11. In a hydraulic stabilizer assembly for supporting a sprung mass relative to an unsprung mass by means of a power piston reciprocably arranged within a power cylinder, the stabilizer assembly including a source of fluid under pressure, a fluid drain means and a control means for selectively communicating the source and drain means with the power cylinder, the control means comprising
- a control valve for selectively communicating both the source drain means with opposite sides of the power piston within the power cylinder, the control valve comprising a spring-centered control valve spool reciprocably arranged within a control valve bore, and
- regulator means for operating the control valve in response to pressure variations developed by movement of the power piston within the power cylinder in response to relative vertical movement between the sprung and unsprung masses, the regulator means comprising one end of the control valve spool being in communication by means of a signal passage with a portion of the power cylinder subject to increased pressurization in response to relative movement of the sprung mass and unsprung mass toward each other, a fluid accumulator being in communication with the other end of the control valve spool, the one end of the control valve spool being in communication with both the fluid accumulator and the other end of the control valve spool by means of a restrictive orifice.

12. The hydraulic stabilizer assembly of claim 11 further comprising a damped levelling system separately providing selective communication of the source and drain means with opposite sides of the power piston in response to relatively minor external forces tending to shift the power piston within the power cylinder.

13. In a hydraulic stabilizer assembly for supporting a sprung mass relative to an unsprung mass by means of a power piston reciprocably arranged within a power cylinder, the stabilizer assembly including a source of fluid under pressure, a fluid drain means and a control means for selectively communicating the source and drain means with the power cylinder, the control means comprising
- a control valve for selectively communicating both the source drain means with opposite sides of the power piston within the power cylinder,
- regulator means for operating the control valve in response to pressure variations developed by movement of the power piston within the power cylinder in response to relative vertical movement between the sprung and unsprung masses,
- load compensating means for limiting response of the control valve to relatively minor pressure variations developed within the power cylinder, and
- a damped levelling system separately providing selective communication of the source and drain means with opposite sides of the power piston in response to relatively minor external forces tending to shift the power piston within the power cylinder, the damped levelling system being integrally formed by the power piston.

14. The hydraulic stabilizer assembly of claim 13 wherein the damped levelling system comprises a pair of restrictive orifices formed by the power piston for selectively communicating the source with respective ends of the power cylinder.

15. The hydraulic stabilizer assembly of claim 13 further comprising a mechanical support linkage interconnected between the sprung mass and unsprung mass, the mechanical support linkage permitting relative movement between the sprung mass and unsprung mass under the control of the hydraulic stabilizer assembly.

16. In a method of stabilizing vertical movement between a sprung mass and an unsprung mass by means of a power piston reciprocably arranged for movement between first and second ends of a power cylinder, movement of the power piston toward the first end of the power cylinder corresponding to relative vertical movement of the sprung and unsprung masses toward each other, the steps comprising
- sensing pressure variations in the power cylinder,
- metering communication of the first end of the power cylinder with a fluid drain and simultaneously metering communication a fluid supply means with the second end of the power cylinder in response to increasing pressure in the first end of the power cylinder and decreasing pressure in the second end of the power cylinder,
- metering communication of the second end of the power cylinder with a fluid drain and simultaneously metering communication of the first end of the power cylinder with a source of fluid under pressure in response to decreasing pressure in the first end of the power cylinder and increasing pressure in the second end of the power cylinder,
- the metering steps being carried out at a rate determined by load compensating means responsive to the rate of movement for the power piston within the power cylinder, and
- damping metered communication for the first and second ends of the power cylinder in response to relatively minor external forces tending to shift the power piston within the power cylinder.

* * * * *